United States Patent
Hochstetler

(10) Patent No.: US 12,250,900 B2
(45) Date of Patent: Mar. 18, 2025

(54) LAWN MOWERS HAVING INTELLIGENT SYSTEMS (SMART MOWER LOGIC), ASSOCIATED SUB-ASSEMBLIES INCORPORATING INTELLIGENT SYSTEMS, AND ASSOCIATED METHODS OF USE

(71) Applicant: Mervin C. Hochstetler, Holland, MI (US)

(72) Inventor: Mervin C. Hochstetler, Holland, MI (US)

( * ) Notice: Subject to any disclaimer, the term of this patent is extended or adjusted under 35 U.S.C. 154(b) by 860 days.

(21) Appl. No.: 17/471,465

(22) Filed: Sep. 10, 2021

(65) Prior Publication Data

US 2023/0084513 A1 Mar. 16, 2023

(51) Int. Cl.
*A01D 34/00* (2006.01)
*G06F 8/65* (2018.01)
(Continued)

(52) U.S. Cl.
CPC ............. *A01D 34/006* (2013.01); *G06F 8/65* (2013.01); *G06Q 10/063114* (2013.01);
(Continued)

(58) Field of Classification Search
CPC .... A01D 34/006; A01D 2101/00; G06F 8/65; G06Q 10/063114; G07C 5/006; G07C 5/008; G07C 5/0808
See application file for complete search history.

(56) References Cited

U.S. PATENT DOCUMENTS 5,042,238 A * 8/1991 White, III ............... B62D 9/00
 280/211
5,488,818 A * 2/1996 Powers .............. A01D 34/6806
 D15/18

(Continued)

FOREIGN PATENT DOCUMENTS

WO WO 2017/173945 10/2017

OTHER PUBLICATIONS

Chicago/Turabian Style Liao, Juinne-Ching, Shun-Hsing Chen, Zi-Yi Zhuang, Bo-Wei Wu, and Yu-Jen Chen. 2021. "Designing and Manufacturing of Automatic Robotic Lawn Mower" Processes 9, No. 2: 358. https://doi.org/10.3390/pr9020358.*

*Primary Examiner* — Gertrude Arthur Jeanglaude
(74) *Attorney, Agent, or Firm* — King & Partners, PLC

(57) ABSTRACT

A zero-turn lawn mower having smart mower logic, including a chassis; a seat, a pair of ground engaging drive wheels; an engine; a pair of transmissions for driving the drive wheels; a pair of manually-moveable handle assemblies for independently controlling the transmissions; a mower deck; and a smart mower logic system comprising a controller that enables at least one of the following: incorporating safety logic to increase user safety during normal operation; reducing equipment abuse through controlled reduced speed modes; monitoring hydraulic pressure readings, torque readings, and wheel revolution readings; calibrating and regulating the pair of drive wheels; controlling the sensitivity of the pair of handles; providing real-time GPS locations (Continued)

readings; uploading data in real time to a management server; and transmitting a communication and/or billing to customer upon job completion with optional photograph and/or GPS verified time on job data.

13 Claims, 6 Drawing Sheets

(51) Int. Cl.
    *G06Q 10/0631*     (2023.01)
    *G07C 5/00*     (2006.01)
    *G07C 5/08*     (2006.01)
    *A01D 101/00*     (2006.01)

(52) U.S. Cl.
    CPC .............. *G07C 5/006* (2013.01); *G07C 5/008* (2013.01); *G07C 5/0808* (2013.01); *A01D 2101/00* (2013.01)

(56) References Cited

U.S. PATENT DOCUMENTS

| | | | |
|---|---|---|---|
| 5,570,570 A | 11/1996 | Klas et al. | |
| 6,185,920 B1 | 2/2001 | Oxley | |
| 6,601,663 B2 | 8/2003 | Hauser | |
| 6,640,526 B2 * | 11/2003 | Velke | B62D 11/183 56/10.8 |
| 7,146,787 B2 | 12/2006 | Walker | |
| 7,237,629 B1 | 7/2007 | Bland et al. | |
| 7,647,754 B2 | 1/2010 | Velke et al. | |
| 8,522,901 B1 | 9/2013 | VanLue | |
| 9,632,489 B2 | 4/2017 | Biber et al. | |
| 10,058,031 B1 * | 8/2018 | Brown | B60K 7/0007 |
| 10,293,855 B2 | 5/2019 | Swecker | |
| 10,464,374 B1 * | 11/2019 | Jolley | A01D 75/28 |
| 10,629,005 B1 * | 4/2020 | Brown | G07C 5/0841 |
| 10,932,409 B2 | 3/2021 | Ingvalson et al. | |
| 11,395,458 B1 * | 7/2022 | Brown | A01D 34/006 |
| 2003/0006076 A1 | 1/2003 | Tamor | |
| 2003/0019682 A1 | 1/2003 | Schaedler et al. | |
| 2003/0062212 A1 | 4/2003 | Samejima et al. | |
| 2003/0102171 A1 | 6/2003 | Hauser | |
| 2005/0003919 A1 | 1/2005 | Hasegawa et al. | |
| 2005/0044836 A1 | 3/2005 | Goto et al. | |
| 2008/0072556 A1 | 3/2008 | Tegtmeier et al. | |
| 2014/0345240 A1 | 11/2014 | Poe | |
| 2016/0100522 A1 | 4/2016 | Yamauchi et al. | |
| 2017/0021766 A1 | 1/2017 | Dwyer | |
| 2017/0282784 A1 | 10/2017 | Foster et al. | |
| 2018/0328816 A1 | 11/2018 | Schnell et al. | |
| 2020/0275604 A1 | 9/2020 | Chen et al. | |

* cited by examiner

LAWN MOWERS HAVING INTELLIGENT SYSTEMS (SMART MOWER LOGIC), ASSOCIATED SUB-ASSEMBLIES INCORPORATING INTELLIGENT SYSTEMS, AND ASSOCIATED METHODS OF USE

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to lawn mowers and, more particularly, to residential and commercial lawn mowers (e.g., zero-turn lawn mowers, walk-behind lawn mowers, Z-turn lawn mowers, reel lawn mowers, etcetera) having smart mower logic (SML) and/or intelligent systems that have the capacity to selectively gather, obtain, monitor, store, record, and analyze data associated with components of the lawn mowers and controllably communicate and disseminate such data with other systems and users, including owners and customers. The smart mower logic systems of the present invention increase user safety and lawn care quality (e.g., professional outcomes for customers), as well as decrease equipment abuse. The intelligent systems of the present invention also enable a user to report, for example, mowing conditions, time spent on the job, precision and accuracy of mowing, mowing completeness, error reports, diagnostic component and/or equipment reports—just to name a few.

The present invention further relates to lawn mower sub-assemblies including, but not limited to, hydraulic and/or electrical sub-assemblies having smart mower logic systems, as well as associated methods for using the same.

2. Background Art

Lawn mowers and associated systems have been known in the art for years and are the subject of a plurality of patents and/or publications, including: U.S. Pat. No. 10,293,855 entitled "Zero-Turn Mower with Selective Steering Control," U.S. Pat. No. 7,146,787 entitled "Walk Behind Mower," U.S. Pat. No. 5,042,238 entitled "Riding Lawn Mower," United States Patent Application Publication Number 2014/0345240 entitled "Zero-Turn Lawnmower with Improved Control Handles," United States Patent Application Publication Number 2008/0072556 entitled "Rotary Zero-Turn Steer-By-Wire Mower," United States Patent Application Publication Number 2005/0044836 entitled "Riding Mower," United States Patent Application Publication Number 2005/0003919 entitled "Riding Lawn Mower," United States Patent Application Publication Number 2003/0062212 entitled "Riding Mower," United States Patent Application Publication Number 2003/0006076 entitled "Walk Behind Working Machine," and International Patent Application Publication Number WO 2017/173945 entitled "Electric-Powered Zero-Turn Stand-On Mower"—all of which are hereby incorporated herein by reference in their entirety including all references cited therein.

U.S. Pat. No. 10,293,855 appears to disclose a zero-turn mower with selective steering control. The zero-turn mower includes a pair of front wheels having sprockets operably connected thereto, a drive gear rotatably disposed within a housing affixed to the mower frame, and a drive chain that couples the sprockets to the drive gear. A plate gear is slidably disposed on the frame. A pair of actuator arms bias the plate gear rearward to a first position. A pair of pedals can be depressed simultaneously to move the plate gear forward to a second position. When the plate gear is in the first position the drive gear is disengaged, and the front wheels may turn freely to any direction. When the plate gear is in the second position the drive gear engages, and the pedals allow the user to control the direction of the front wheels, allowing the mower to be safely utilized on sloped terrain.

U.S. Pat. No. 7,146,787 appears to disclose a self-propelled walk behind mower comprised of a tractor unit and a mowing deck. The tractor unit is hydrostatically driven with a control system whereby the forward speed of the tractor is set by operating an electric rocker switch with an operator's thumb. Hand levers are used to turn the tractor to the left and the right. The tractor unit comprises two drive wheels and a third wheel that is pivotally attached, letting the tractor unit stand upright when no implements are attached. Implements attach to the front of the tractor through a movable attachment so that the tractor and implement can closely follow the contour of the ground while keeping the operator controls in a convenient position.

U.S. Pat. No. 5,042,238 appears to disclose an improved riding lawn mower that comprises a frame having steerable front wheels and rear traction wheels. Each rear wheel is independently driven by a separate transmission. A steering wheel is used to turn the front wheels to control the direction of movement of the rider. Linkage assemblies connected to the steering assembly declutch the rear wheel on the inside of a sharp turn to give the mower near zero-turn radius (ZTR) turning ability. However, the declutched rear wheel freewheels to avoid tearing the turf and the mower does not speed up during the turn.

United States Patent Application Publication Number 2014/0345240 appears to disclose a lawnmower that includes a chassis; a seat supported on the chassis for permitting an operator to sit or stand on the chassis; a pair of drive wheels for supporting the chassis above a ground surface; an engine and a pair of transmissions for driving the drive wheels; and a pair of manually-moveable handle assemblies for controlling the transmissions. Each handle assembly includes a substantially vertically-extending control handle, wherein the control handles are mounted outboard of opposite sides of the seat so as not to block the operator's ingress or egress from the seat.

United States Patent Application Publication Number 2008/0072556 appears to disclose a rotary zero-turn steer-by-wire mower for golf courses that includes a chassis, forward drive wheels mounted on axles mounted underneath the chassis and connected to an engine and transmission and swivel-mounted rear wheels mounted on the chassis. Side-by-side rear mower decks are mounted underneath the chassis with three side-by-side mounted forward mower decks mounted on a forward mower deck mounting structure extending forwards from the chassis, each of the five mower decks being independently mounted on a floating mount structure with hydraulic connections for driving the mower blades mounted therewithin. The mower unit is controlled by a steer-by-wire twin stick speed and direction control system which eliminates mechanical connection between the mower controls and steering and throttle systems, thereby reducing mechanical breakdown possibilities.

United States Patent Application Publication Number 2005/0044836 appears to disclose a brake pedal for braking right and left rear wheels and a parking operation member for maintaining a step-on condition of the brake pedal are provided on a step. As a result, the step-on condition of the brake pedal can be maintained by, for example, stepping on the parking operation member with the left foot after applying the step-on brake of the brake pedal with the right foot. Thus, the body can be stopped without using hands and the stopped condition can be maintained over an extended period of time. Braking and parking operations of the body are simple, and moreover, an improved right-and-left weight balance of the body improves the traveling body in operation, and operations at the mower deck side. In particular, operation related to mowing height adjustment can be improved.

United States Patent Application Publication Number 2005/0003919 appears to disclose a transmission for speed changing and steering of a vehicle that comprises a first hydrostatic transmission (HST) and a first differential for speed changing and a second HST and a second differential for steering. The first HST is a combination of a hydraulic pump and motor. The pump is driven by an engine and the motor is drivingly changeable by operation of a speed change pedal. Output power from the motor is transmitted into a pair of first differential output shafts as axles through the first differential. The second HST is a combination of a hydraulic pump and motor. The second pump is driven by output power from the first HST and the second motor is drivingly changeable by operation of a steering wheel. A pair of second differential output shafts are rotated in opposite directions by output power of the motor, so that when turning, the first differential output shaft on the opposite side of the turning direction is accelerated.

United States Patent Application Publication Number 2003/0062212 appears to disclose a riding mower that includes a pair of right and left propelling wheels, an engine disposed rearwardly of axles of the propelling wheels, a pair of right and left transmission cases corresponding to the propelling wheels and supporting the propelling wheels, respectively, a pair of right and left HSTs coupled to the transmission cases for outputting power thereto, respectively, a center case housing a power distributor for transmitting power from the engine to the pair of right and left HSTs, and a mower unit disposed forwardly of the propelling wheels. The center case is disposed forwardly of the axles of the propelling wheels.

United States Patent Application Publication Number 2003/0006076 appears to disclose a parallel hybrid electric vehicle method and system including an internal combustion engine, an electric traction motor/generator, and a controller. A control strategy is provided to prevent unpredicted or undesired engine starts by anticipating the need for the vehicle engine, while avoiding "false starting" the engine or allowing an annoying lag in performance that will occur if the engine is not started in advance of an actual requirement. The invention anticipates the need for engine starts by monitoring vehicle speed and driver demand and their rates of change. The invention allows consistent performance and operates in a manner pleasing to the customer because a substantially constant drive force is maintained.

International Patent Application Publication Number WO 2017/173945 appears to disclose an electric-powered zero-turn stand-on mower, comprising: a frame formed by connecting a rear frame assembly and a front frame assembly; an operating assembly, provided on the rear frame assembly, for controlling the mower; a drive wheel assembly connected to the rear frame assembly; a turning wheel assembly connected to the front frame assembly; a stand-on assembly, fixedly connected to the rear frame assembly, for an operator to stand on; a height adjustment assembly connected to the rear frame assembly; a mowing platform assembly connected to the height adjustment assembly, wherein the height adjustment assembly is used for adjusting the height of a mowing assembly; a drive axle, provided on the rear frame assembly, for independently driving the drive wheel assembly; a battery housing formed by a connection of the front frame assembly and the rear frame assembly; and a battery pack, provided in the battery housing, for providing power to the drive axle and the mowing platform assembly. The electric-powered zero-turn stand-on mower uses electric power and an optimized transmission structure to enhance control precision and reduce costs. The mower generates little vibration, low noise, and zero pollution, and provides user comfort.

While the above-identified patents and/or publications do appear to disclose various lawn mowers and associated systems, their configurations remain non-desirous, incompatible, and/or problematic inasmuch as, among other things, none of the above-identified lawn mowers and associated systems appear to include assemblies having smart mower logic (SML) and/or intelligent systems that have the capacity to selectively gather, obtain, monitor, store, record, and analyze data associated with components of the lawn mowers and controllably communicate and disseminate such data with other systems and users. Furthermore, none of the above-identified lawn mowers and associated systems appear to utilize and/or be compatible with intelligent systems associated with electrical and/or hydraulic sub-assemblies.

It is therefore an object of the present invention to provide lawn mowers having smart mower logic and/or intelligent systems that have the capacity to selectively gather, obtain, monitor, store, record, and analyze data associated with components of the lawn mowers, and controllably communicate and disseminate such data with other systems and users.

These and other objects of the present invention will become apparent in light of the present specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

SUMMARY OF THE INVENTION

Figure 1:
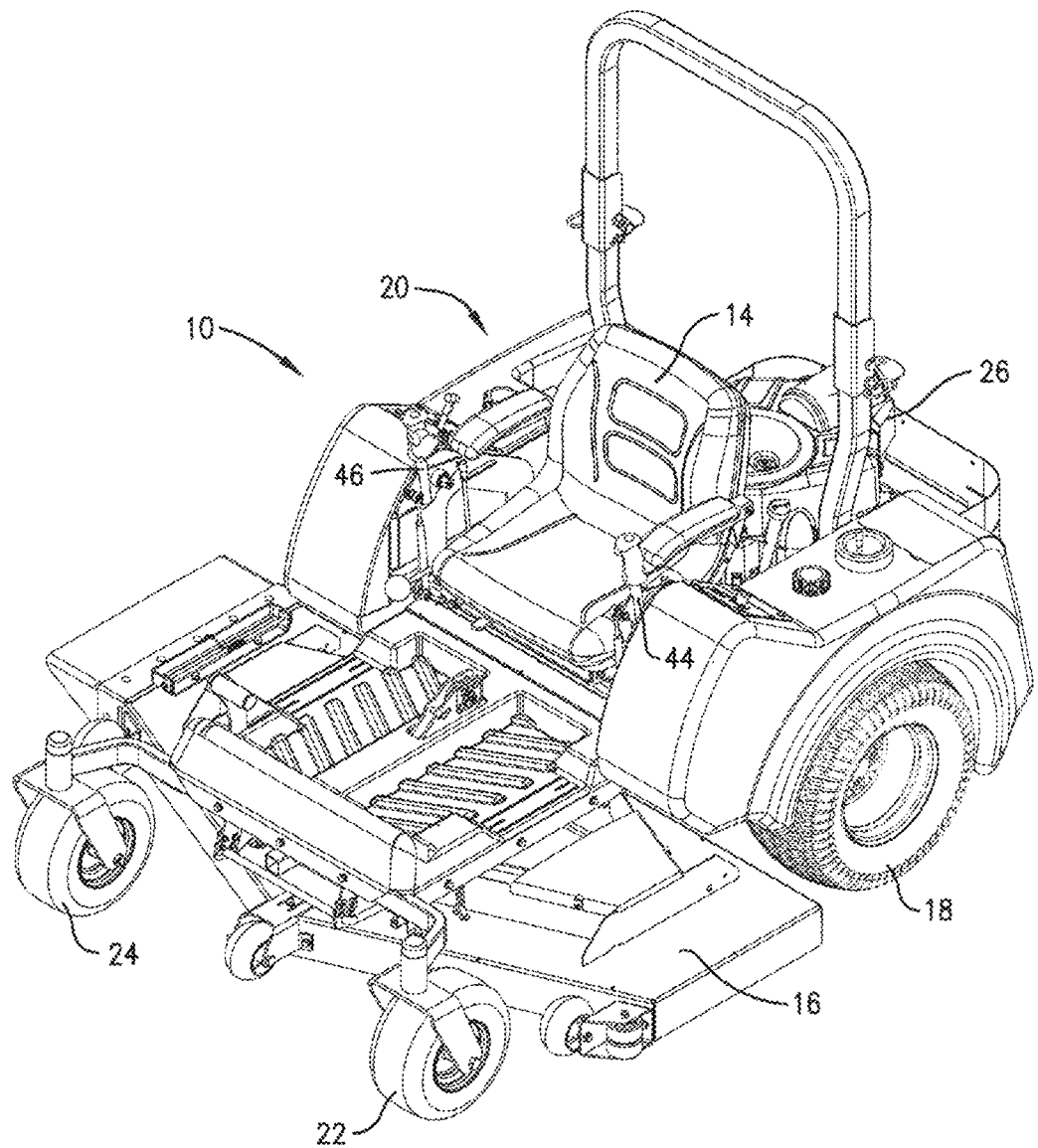
FIG. 1 of the drawings is a front perspective view of a lawn mower fabricated in accordance with the present invention.

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to, in one embodiment, a lawn mower having smart mower logic comprising, consisting essentially of, and/or consisting of: (a) a chassis or frame-assembly; (b) a seat, wherein the seat is associated with the chassis for permitting an operator to sit or stand on the chassis; (c) a pair of ground engaging drive wheels, wherein the drive wheels move independently of each other; (d) an engine, wherein the engine is associated with the chassis; (e) a pair of transmissions for driving the drive wheels; (f) a pair of manually-moveable handle assemblies for independently controlling the transmissions; (g) a mower deck associated with the chassis, wherein the mower deck includes at least one grass-cutting blade; and (h) a smart mower logic system comprising a controller that enables at least one of the following: (1) incorporating safety logic to increase user safety during normal operation; (2) reducing equipment abuse through controlled reduced speed modes; (3) monitoring hydraulic pressure readings, torque readings, and wheel revolution readings; (4) calibrating and regulating the pair of drive wheels; (5) controlling the sensitivity of the pair of handles; (6) providing real-time GPS locations readings; (7) uploading data in real time to a management server; and (8) transmitting a communication and/or billing to customer upon job completion with optional photograph and/or GPS verified time on job data.

The present invention is also directed to, in one embodiment, a lawn mower having smart mower logic comprising, consisting essentially of, and/or consisting of: (a) a chassis or frame-assembly; (b) a seat, wherein the seat is associated with the chassis for permitting an operator to sit or stand on the chassis; (c) a pair of ground engaging drive wheels, wherein the drive wheels move independently of each other; (d) an engine, wherein the engine is associated with the chassis; (e) a pair of transmissions for driving the drive wheels; (f) a pair of manually-moveable handle assemblies for independently controlling the transmissions; (g) a mower deck associated with the chassis, wherein the mower deck includes at least one grass-cutting blade; and (h) a smart mower logic system comprising a controller, wherein the controller is configured to at least one of selectively gather, obtain, monitor, store, and record data associated with components of the lawn mower, and wherein the controller communicatively couples the lawn mower with a management server over a network and transmits data to the management server for analysis.

The present invention is further directed to, in one embodiment, a method for using a smart mower logic system with a lawn mower, comprising, consisting essentially of, and/or consisting of the steps of: (a) providing a lawn mower having a smart mower logic system; (b) selectively gathering, obtaining, monitoring, storing, recording, and/or analyzing data associated with components of the lawn mower; and (c) controllably communicating and/or disseminating data with at least one of another system and user.

The present invention is yet further directed to, in one embodiment, a method for using a smart mower logic system with a lawn mower, comprising, consisting essentially of, and/or consisting of the steps of: (a) obtaining operational data for a lawn mower, the operational data being generated for any of a battery, an engine, a transmission, a transaxle, a blade, a tire, a timer, and a fuel tank of the lawn mower; (b) communicatively coupling the lawn mower with a management server; (c) querying the lawn mower for operational data for any of the battery, the engine, the transmission, the transaxle, the blade, the tire, the timer, and the fuel tank; (d) performing at least one operational data analysis process on the obtained operational data; and (e) transmitting an alert message to an owner of the lawn mower if the operational analysis indicates that a threshold violating event has occurred.

In a preferred embodiment of the present invention, the at least one operational data analysis process comprises comparing an actual operational time to an operational time threshold, wherein the threshold violating event includes the actual operational time not meeting the operational time threshold. In this embodiment, the actual operational time relates to any of the battery, the engine, the transmission, the transaxle, the blade, the tire, the timer, the fuel tank, and the lawn mower.

In another preferred embodiment of the present invention, the at least one operational data analysis process comprises comparing an actual engine run time to an engine run threshold, wherein the threshold violating event includes the actual engine run not meeting the engine run time threshold.

In yet another preferred embodiment of the present invention, the at least one operational data analysis process comprises comparing actual square footage covered by the lawn mower assembly to an expected square footage. In this embodiment, the actual square footage is preferably calculated by counting transaxle revolutions of the transaxle of the lawn mower.

The present invention is directed to, in one embodiment, a method for using a smart mower logic system with a lawn mower, comprising, consisting essentially of, and/or consisting of the steps of: (a) detecting a failure of a component of a lawn mower during operation or startup of the lawn mower; (b) establishing communication with a management server; and (c) transmitting a fault message to the management server, the fault message comprising an indication as to the component that failed, wherein the component includes any of a battery, an engine, a transmission, a transaxle, a blade, a tire, a timer, and a fuel tank.

In a preferred embodiment of the present invention, the method comprises receiving an emergency shut down signal from the management server; and performing an emergency shut down upon receiving the emergency shut down signal from the management server.

In another preferred embodiment of the present invention, the method comprises automatically ordering a replacement part for an identified failed component upon detection of the failure.

In yet another preferred embodiment of the present invention, the method comprises pushing a smart mower logic update to the lawn mower upon establishing communication with the management server.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

It will be further understood that FIGS. 1-6 are merely representations and/or illustrations of lawn mowers and their associated sub-assemblies. As such, some of the components may be distorted from their actual scale for pictorial clarity and/or image enhancement.

Unless otherwise specified, the machines, sub-assemblies, components and/or parts provided herein below are commercially available from Aesthetic Gardner, L.L.C. (Holland, Michigan) or a subsidiary thereof.

Figure 2:
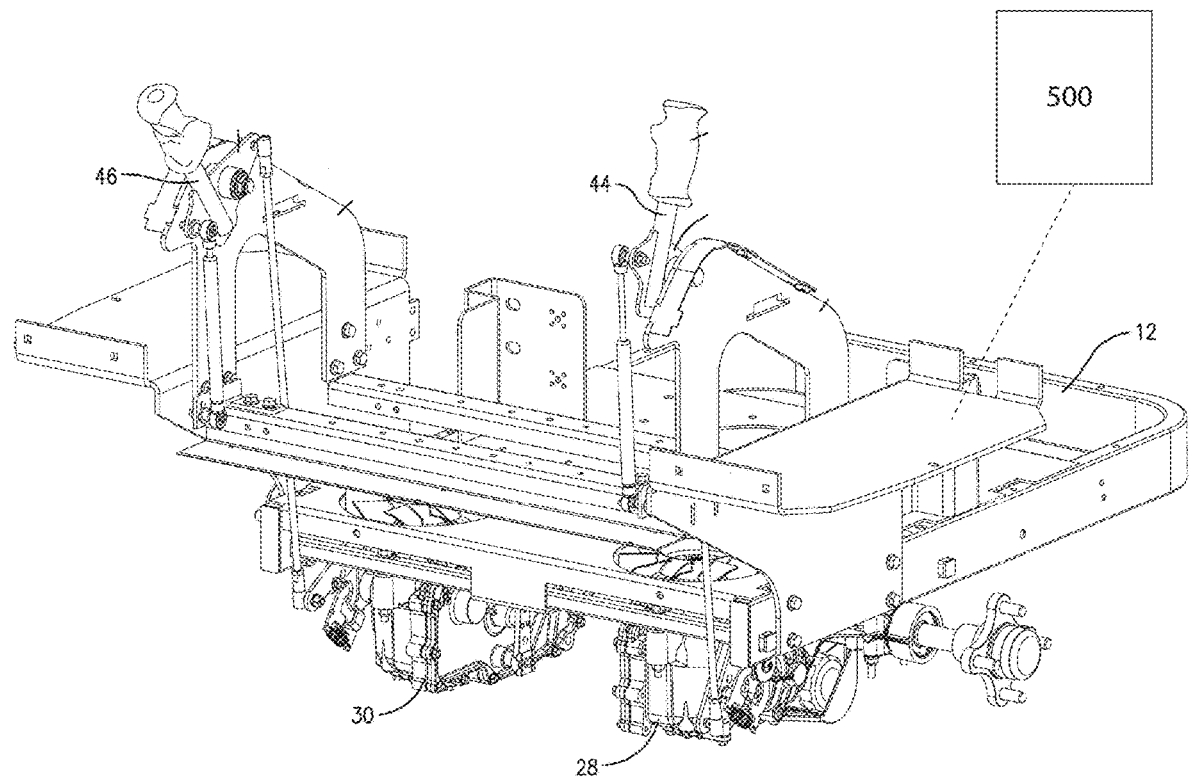
FIG. 2 of the drawings is a fragmented perspective view of a lawn mower fabricated in accordance with the present invention.

Referring now to the drawings, and to FIGS. 1-2 in particular, perspective views of lawn mower 10 having smart mower logic and/or intelligent system is shown as generally comprising chassis or frame-assembly 12, seat 14, wherein the seat is secured to chassis 12, mower deck 16, wherein the mower deck includes at least one grass-cutting blade, ground engaging drive wheels 18, wherein the drive wheels move independently of each other, fuel tank reservoir 20, front caster wheels 22 and 24, engine 26, pair of transmissions 28 and 30 for driving the drive wheels; pair of manually-moveable handles 44 and 46 for independently controlling the transmissions, and a smart mower logic system comprising controller 500 that enables at least one of the following (a) incorporating safety logic to increase user safety during normal operation, (b) reducing equipment abuse through controlled reduced speed modes, (c) monitoring hydraulic pressure readings, torque readings, and wheel revolution readings, (d) calibrating and regulating the pair of drive wheels, (e) controlling the sensitivity of the pair of handles, (f) providing real-time GPS locations readings, (g) uploading data in real time to a management server, (h) transmitting a communication and/or billing to customer upon job completion with optional photograph and/or GPS verified time on job data, and/or (i) transmitting an error report, and/or diagnostic component and/or equipment failure and/or non-failure report. It will be understood that while the present invention has been disclosed for use in accordance with zero-turn lawn mowers other types of lawn mowers are likewise contemplated for use. It will be understood that the lawn mowers having smart mower logic and/or intelligent systems of the present invention may further and/or optionally include an electrical system, a hydraulic system, a bagger, a power flow system, a steering wheel, a foot pedal, and one or more attachments and/or accessories.

As will be explained in greater detail below, the smart mower logic system preferably comprises controller 500, wherein the controller is configured to at least one of selectively gather, obtain, monitor, store, and record data associated with components of the lawn mower, and wherein the controller communicatively couples the lawn mower with a management server over a network and transmits data to the management server for analysis.

In accordance with the present invention, a method for using a smart mower logic and/or an intelligent system with a lawn mower is provided and generally, comprises the following steps: (1) providing a lawn mower having smart mower logic and/or an intelligent system; (2) selectively gathering, obtaining, monitoring, storing, recording, and/or analyzing data associated with components of the lawn mower; and (3) controllably communicating and/or disseminating data with at least one of another system and user. In particular and as is collectively shown in FIGS. 1-6, an intelligent system enables a lawn mower to transmit data obtained from the lawn mower to during normal use, for example, a storage or data server, which, in turn, transmits selected data to, for example, an end user via email and/or text messaging.

FIG. 2 includes printed circuit board (PCB) 500 (e.g., controller) which includes the smart mower logic and can be associated with any component of lawn mower 10.

The PCB 500 (e.g., controller) functions as a main controller board for controlling and communicating with various components of the lawn mower. In some embodiments, the PCB 500 can include one or more features of an example computing machine illustrated and described with respect to FIG. 6. The PCB 500 includes at least a processor and a memory for storing executable instructions. The processor can execute the instructions to provide any of the data sensing, gathering, processing, transforming, and/or communication features described herein.

It will be understood that the PCB 500 can be referred to generally as having smart mower logic and/or an intelligent system or component that is configured to provide data gathering, recording, logging, transmitting, and analysis functionalities. In other embodiments, an intelligent system can include the PCB 500 that cooperates with a management server, where the PCB 500 gathers and collects operational data for the lawn mower and the management server performs data analysis functionalities on the operational data.

Generally, the PCB 500 is communicatively coupled to one or more of the components of the lawn mower and/or accessory, either directly or indirectly. For example, the PCB 500 directly communicates with the batteries of the lawn mower, through a battery interface, while the PCB 500 indirectly couples with a transaxle motor interface through a speed control board.

The battery interface allows for the PCB 500 to communicate with the batteries to receive feedback including charge level, average usage and current draw, as well as other battery related metrics.

A charger interface allows the PCB 500 to determine charging metrics such as average charging times.

A main power key switch is controlled by the PCB 500 to allow the lawn mower to be turned on and off. Key metrics around the main power key switch preferably include start and stop times. The PCB 500 can time stamp each operation such as device on and device off instances and record these metrics for statistical or reporting purposes. Other statistics could include time duration between device on and device off operations, which indicate duration of usage for the lawn mower.

An hour meter switch is controlled by the PCB 500 to calculate hours of operation for the lawn mower, in some embodiments.

Sensors associated with the blade and/or drive wheels can be controlled by the PCB 500 to selectively control engagement or disengagement of the blade or drive wheels of the lawn mower. The PCB 500 can track blade operations by measuring engagement and disengagement of the blade and/or PTO drive.

These statistics can be compared against device on and device off periods to determine how long the blade is engaged compared to the overall time frame of device on periods. By way of example, the PCB 500 can measure that the device is in a device on state for two hours, but the blade was only in use for 15 minutes.

A safety switch can be controlled with the PCB 500, for example, to lift a mower deck and/or blade from contact with the grass or surface being mowed. In some embodiments, when the PCB 500 activates a safety switch, the PTO can be controlled to disengage the blades on the mower deck. Other safety related operations can also likewise be accomplished using the safety switch.

An emergency control switch is controlled by the PCB 500 to control operation of an emergency switch of the lawn mower. A user can stop operation of the lawn mower by actuating the emergency switch. Actuation of the emergency switch is sensed by the PCB 500, causing the PCB 500 to selectively stop engine, drive wheels, transmissions, PTO, transaxle, cutting blades, electrical system, hydraulic system, and/or accessories.

In one embodiment, the emergency control switch can be used to selectively disrupt power provided to a speed control board. That is, the speed control board is configured to control operation of the transaxle motor, by way of the transaxle motor interface.

A pair of light interfaces can be used by the PCB 500 to selectively control operation of lights that indicate operational statuses of the lawn mower 10, such as forward, backward, power on, blade engagement, and so forth.

In one embodiment, a speed potentiometer is controlled by a speed control board to sense input from a user that can be used to vary the speed of the device. For example, the speed potentiometer can receive a speed indication from a user. The speed indication is received by the PCB 500 from input into the speed potentiometer. This input is then translated into rotational speed of the transaxle motor through the transaxle motor interface.

The forward and reverse control of the drive wheels is preferably controlled by handles 44 and 46. In some embodiments, a speed control board utilizes the control handles to provide movement of the lawn mower. In other embodiments, the drive wheels are controlled by a steering wheel and/or foot pedal.

In one embodiment, in response to signals through the control handles a transaxle interface can be used by a speed control board to selectively control the operation of a transaxle motor. For example, the speed control board can selectively control the forward and/or backward rotation of one or both of the drive wheels.

Figure 6:
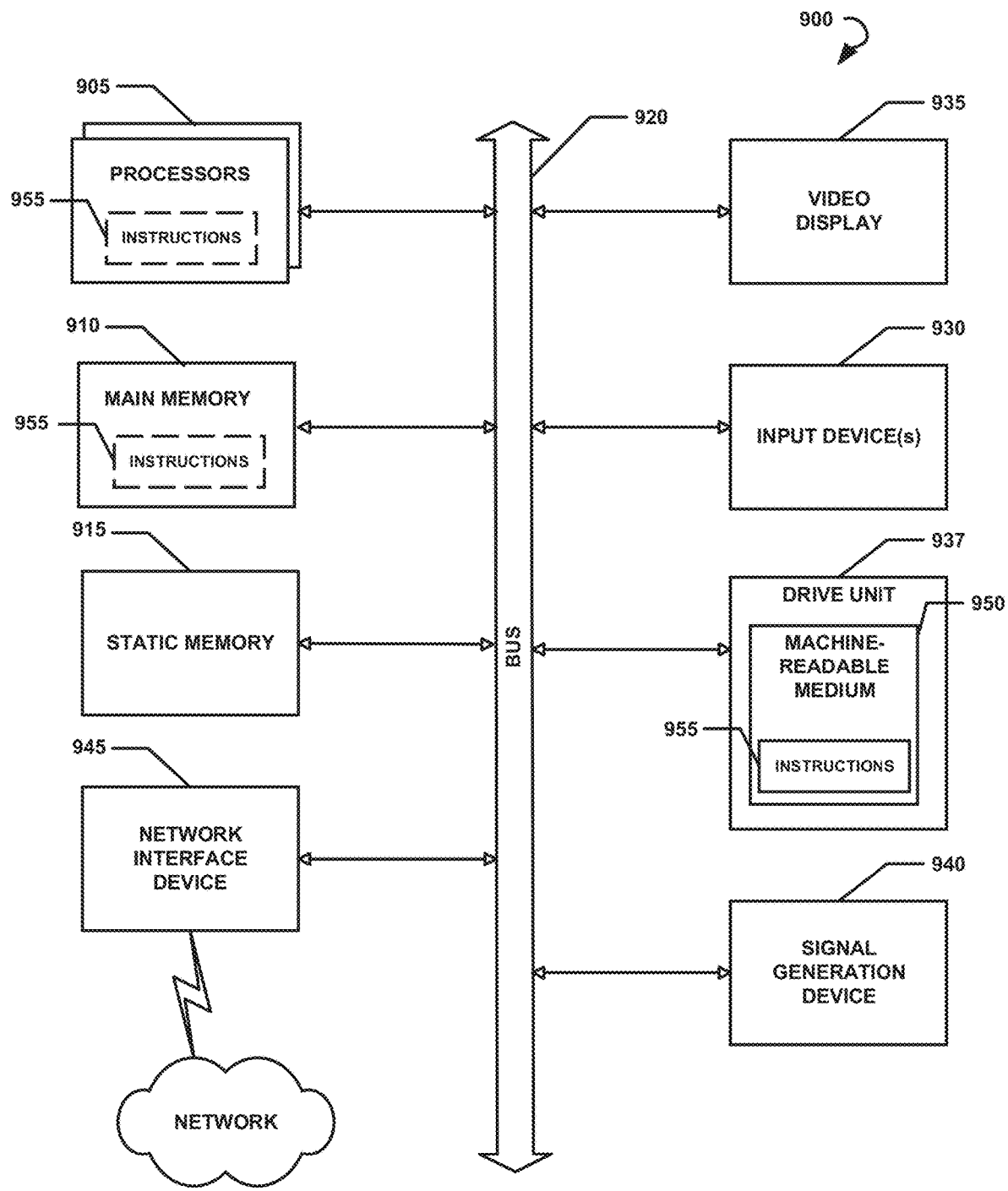
FIG. 6 of the drawings is a diagrammatic representation of a machine in the form of a computer system.

As with the PCB 500, a speed control board can include one or more of the components of the computing machine of FIG. 6, such as a processor and memory. To be sure, the memory is configured with executable instructions that allow the processor to perform any of the functional or process related steps described herein.

Additionally, the PCB 500 can be configured to sense and collect the operational information. For example, the PCB 500 can determine operational speeds for a transmission, transaxle, engine, usage times, and so forth.

The PCB 500 can also control the cutting blades. As with other components, the PCB 500 can be configured to sense and collect operational details of components.

Figure 3:
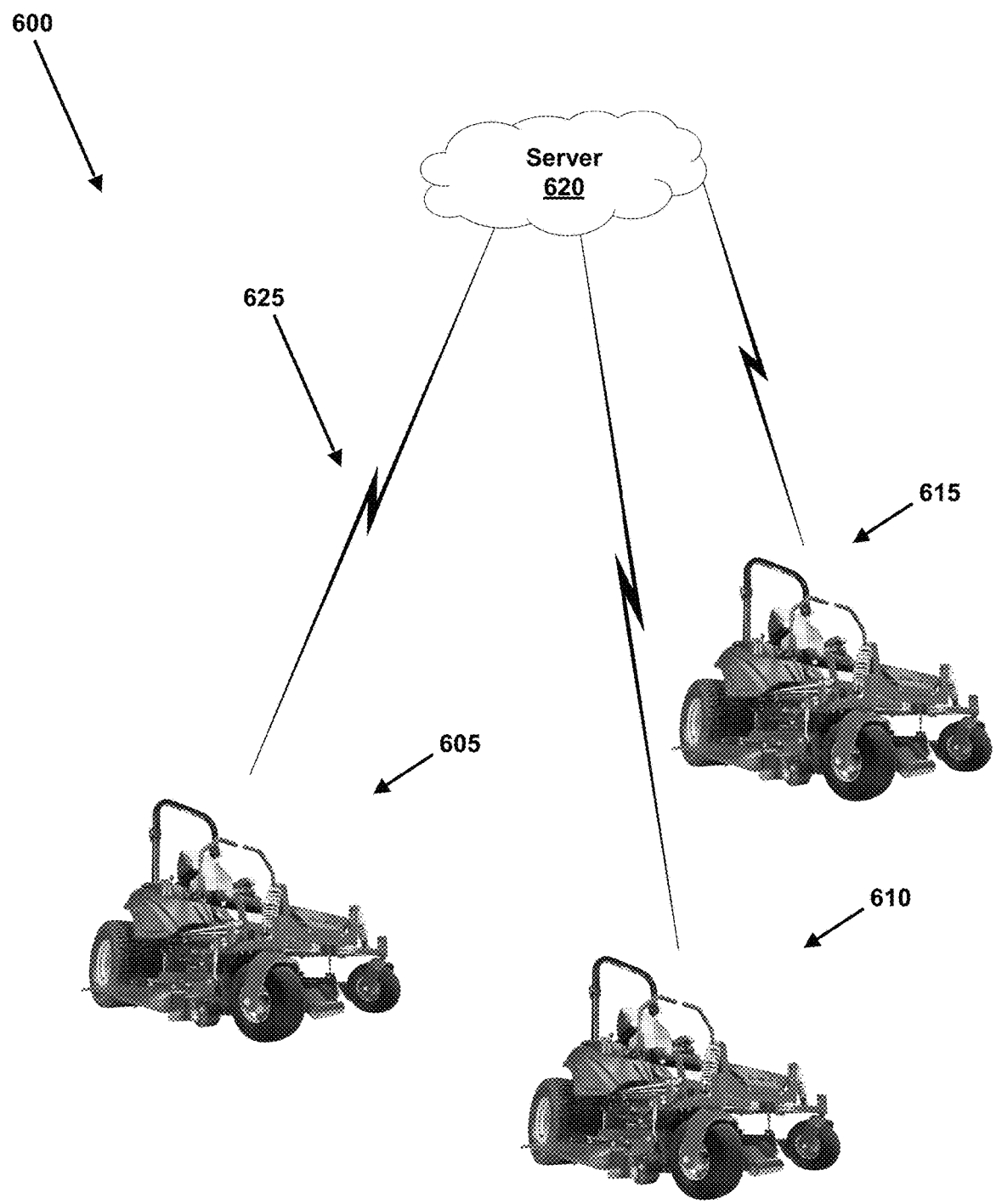
FIG. 3 of the drawings is an illustrative example of a network system of lawn mowers.

In some embodiments, the PCB 500 communicates within an intelligent system 600, illustrated in greater detail in FIG. 3. The PCB 500 can include any wired or wireless means of communication such as a wireless communications interface. The wireless communications interface can utilize any protocol for network communication including short range protocols such as Bluetooth, near field communications (NFC), infra-red, and so forth. The wireless communications interface can also include utilize Wi-Fi, a cellular network, or other similar networks using other protocols.

FIG. 3 illustrates an example network system of devices. The networked system 600 comprises a plurality of devices 605, 610, and 615, which can all communicatively couple with a management server 620 over a network 625.

Each of the plurality of devices 605-615 can be collocated in the same facility, such as a jobsite, building, or other location. In other embodiments, one or more (or all) plurality of devices 605-615 can be remotely located from one another.

Each of the plurality of devices 605-615 can gather and report its operational metrics to the management server 620 over the network 625, as will be discussed in greater detail below.

Exemplary networks, such as network 625 may include any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including 4GLTE (Long Term Evolution), 3GPP (3G Radio Access Network), WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 620 can further include or interface with any one or more of an RS-232 serial connection, an IEEE-1394 (Fire wire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The management server 620 is preferably implemented in a cloud-computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources. The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In operation, each of the plurality of devices 605-615 can communicate with the management server 620, with each of the plurality of devices 605-615 acting as a node within the network. The management server 620 can track metrics about each of the plurality of devices 605-615 by communicating with the PCB on each of the plurality of devices 605-615.

In some embodiments, data obtained by the PCB of each of the plurality of devices 605-615 is selectively gathered, obtained, monitored, stored, recorded, and/or analyzed by the management system 620.

According to some embodiments, data that is selectively gathered, obtained, monitored, stored, recorded, and/or analyzed, preferably comprises, for example, working time, current, voltage, power, and so forth from, for example, a battery, an engine, a transmission, a transaxle, a blade, a tire, a timer, a fuel tank, and other components of the lawn mower. This data or information is preferably received at the PCB 500 (FIG. 2) associated with the lawn mower 10. That is, the PCB 500 controls the operations of each of the components of the device. As described above, the operational data for each of these components can be captured and logged by the PCB 500 and stored in memory on the PCB 500. In other embodiments, operational data can be stored in memory on the PCB 500 and transmitted asynchronously in batches (according to memory size) to the management server 620. In some embodiments, the operational data can be streamed from the PCB 500 to the management server 620 synchronously.

Each device can be managed by assignment of a device ID by the management system. The device ID can be an assigned number, a SIM card number, an IMEI, a MAC address, an IP address, or other similar unique identifier. The device ID can be appended to each communication transmitted by the PCB 500 to the management server 620.

Stored data or information is preferably analyzed by the management server 620 for parameter compliance, and if, necessary such data or information is then communicated to, for example, an end user, servicing personal, and/or owner. For example, the owner of a lawn mower can set a threshold of hours of operation for the device that are required per jobsite, day, and/or week. If the lawn mower is not operated for a period of time that meets or exceeds this threshold, the lawn mower is identified by the management system 620.

The transfer of data with regard to each individual machine will, among other things, help end users better plan for number of machines and employees at each individual work site. Companies with sizeable staff will find it relevant and useful. It will also improve turn drive (e.g., not having the inner wheel of the lawn mower tear the lawn while turning or maneuvering around a tree) and customer service.

In one embodiment the data or information with regard to usage of each individual machine or mower is collected and transmitted daily at a specific time to, for example, the management server. This will allow end users, as well as, owners, managers, and dealers to access the information that they need, so as to monitor usage of these machines and allow them to extract maximum efficiency during operations. In another embodiment of the present invention, other than information for individual days, cumulative totals and averages are readily available too, and the information is preferably updated through the lifespan of the lawn mower. Examples of data or information uploaded on a daily basis include, for example, the operator's performance, the number of hours and specific time the machine was in operation during the previous 24 hours, the monthly total hours for machine usage, and the total hours of machine usage. Furthermore, the present invention enables recording and analysis of an accumulation total for working parts like batteries, blades, oil, etcetera. Since each component has a lifespan, it will help distributors, dealers, owners, and users selectively monitor the exact time when these components (e.g., need to be changed instead of waiting for them to break down, which will affect the working efficiency of the end users. Another important advantage of having this data or information transfer is that in the event the machine breaks down, (e.g., engine, transmission, blade, etcetera stops working), what has broken down will be selectively transmitted to the appropriate servicing personnel by email and/or cell phone text messaging that is/are responsible for the repairs and maintenance of the machines, management of the end user, and so forth.

Figure 4:
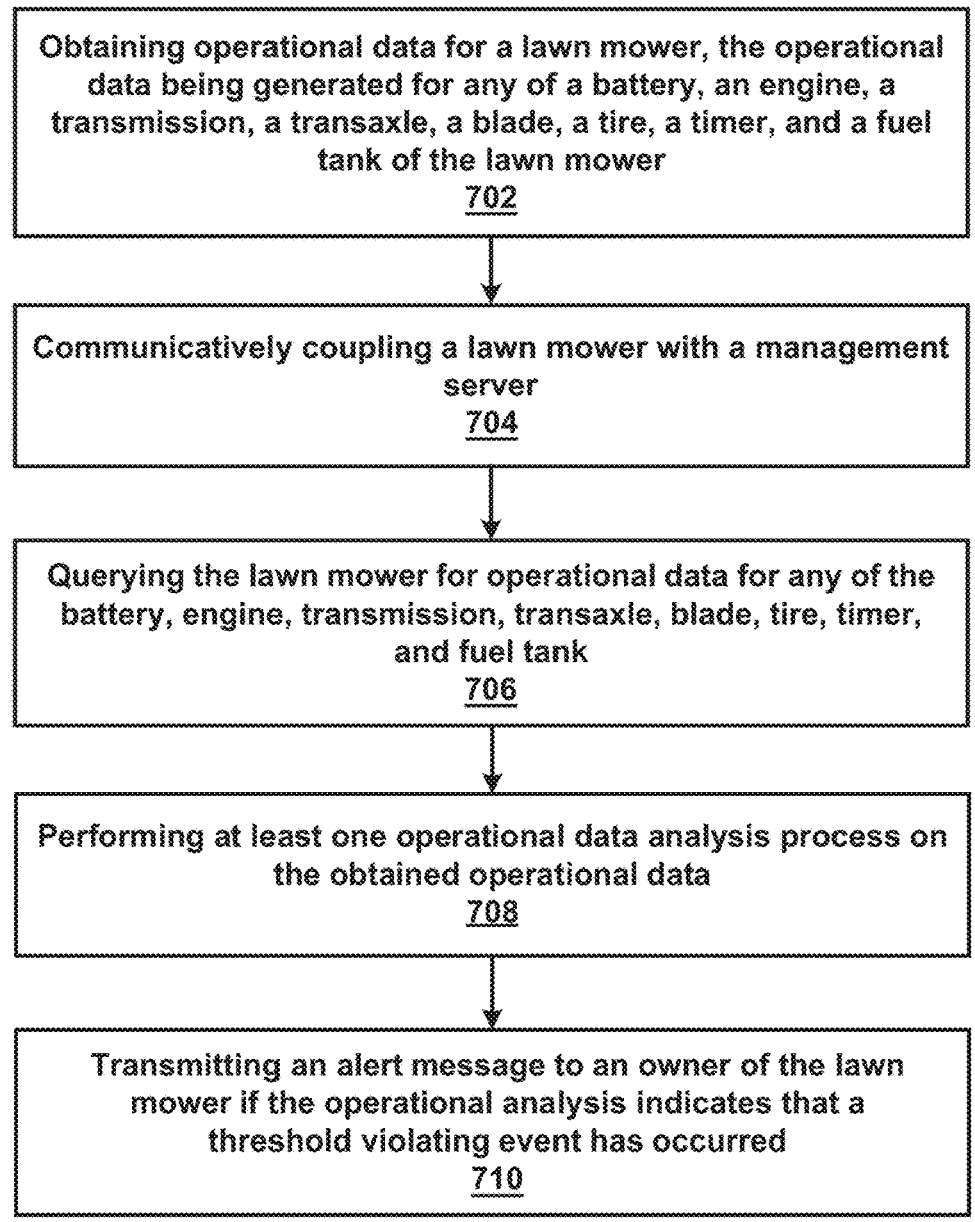
FIG. 4 of the drawings is a flow chart of a method in accordance with the present invention.

FIG. 4 is a flowchart of an example method of the present technology. The method includes obtaining 702 operational data for a lawn mower, the operational data being generated for any one of, for example, a battery, an engine, a transmission, a transaxle, a blade, a tire, a timer, and a fuel tank of the lawn mower.

As mentioned above, this operational data can be gathered by a PCB (such as PCB 500 of FIG. 2) during operation of the lawn mower.

The method also comprises communicatively coupling 704 a lawn mower with a management server. As mentioned above, this could comprise a wireless communication module of the PCB 500 coupling with the management server over a network connection.

Once the lawn mower and the management server are communicatively coupled with one another, the method can further comprise the management server querying 706 the lawn mower for operational data for any one of, for example, a battery, an engine, a transmission, a transaxle, a blade, a tire, a timer, and a fuel tank of the lawn mower. For example, the management server can request battery related operational data from the lawn mower. As mentioned above, this operational data can be stored on the lawn mower in the memory of the PCB. In another example, the management server can request operational data for the blades and tires.

In another embodiment, the PCB can upload all operational data gathered since a last communication session with the management server. This operational data can include operational data as disclosed hereinabove.

In some embodiments, the management server is performing 708 at least one operational data analysis process on the obtained operational data.

Examples of operational data analysis include in one example, comparing the operational time frames for the lawn mower to an expected operational time frame. For example, the owner will determine an operational time frame that the lawn mower should be utilized for. This operational time frame can be calculated from an expected time based on land or lawn square footage, or any other quantifiable metric that can be used to set an operational time frame threshold. Once this threshold is established, the management server can compare the actual operational time frame utilized over a given period of time to the operational time frame threshold. If the actual time does not meet or exceed the operational time frame threshold, the management server can alert the owner.

Thus, in some embodiments, the method includes transmitting 710 an alert message to an owner of the lawn mower if the operational analysis indicates that a threshold violating event has occurred. To be sure, a threshold violating event is any event in which operational data for one or more components of the lawn mower do not appropriately compare with an operational threshold.

In another example, an operational threshold could include a minimum run time for the lawn mower. If the lawn mower is not run for an appropriate amount of time because the user rushed the job, then the quality of the cut can be compromised and/or the lawn can be damaged by the wheels.

In another example, an operational threshold can be set for the cutting blades, which can include a comparison with another operational metric such as total operational time. Assume that the total operational time (e.g., power on to power off) for the lawn mower is one hour, but the cutting blade and/or PTO is only operational for fifteen minutes of the one hour, it can be deduced that the lawn mower was not in actual use for the entire hour.

Additional metrics can be gathered by tracking revolutions of the transaxle, which can be extrapolated into square foot coverage of the lawn mower. Ideally, transaxle revolutions should be compared to overall operational time to ensure that the lawn mower is moving during power on and/or PTO engaged periods. If the lawn mower is left on when no work is being accomplished, this can lead to unnecessary fuel consumption.

Knowledge of the approximate square footage of a cutting area can also be used to determine if the lawn mower is being utilized properly. For example, if by counting transaxle revolutions that the lawn mower has only cut approximately 400 square feet, when the total expected square footage for the cutting area is 2,000 square feet, the management server can detect this discrepancy and transmit an alert message to the owner or anther interested party.

Figure 5:
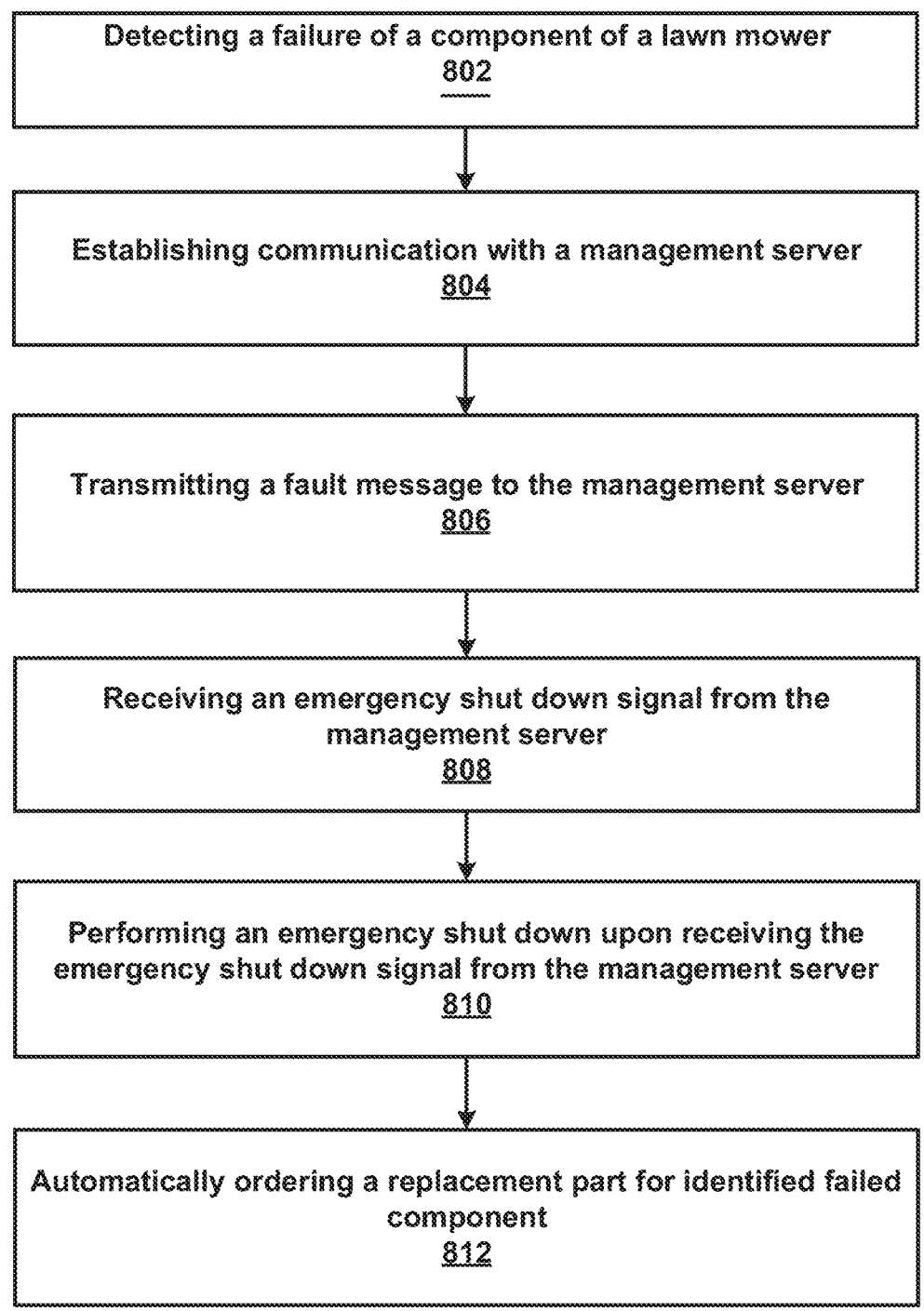
FIG. 5 of the drawings is a flow chart of another method in accordance with the present invention.

FIG. 5 is another flowchart of an example method of the present technology. The method includes a step of detecting 802 a failure of a component of a lawn mower during operation of the detecting 802 a failure of a component of a lawn mower during operation or startup of the lawn mower. For example, the PCB can maintain a set of operational thresholds for each component of the lawn mower. Whenever any of these components is operating below this expected operational threshold, a failure can be deemed to have occurred.

Upon detection of a failure, the method includes the PCB establishing 804 communication with a management server, as well as a step of transmitting 806 a fault message to the management server. The fault message can include an indication as to the component that failed.

If the failure involves a component of the lawn mower that could cause the lawn mower to be a safety hazard, the method can include the lawn mower receiving 808 an emergency shut down signal from the management server. The method also includes performing 810 an emergency shut down upon receiving the emergency shut down signal from the management server. Examples of emergency shut down procedures are described in greater detail supra.

In one embodiment, the method includes an optional step of automatically ordering 812 a replacement part for identified failed component. The lawn mower can communicate directly with a third-party system over the network to order the replacement part. In another embodiment, the management server can identify the failed component and perform a lookup of the manufacturer of the failed component and forward the request to the third-party system or a local inventory system. The management server can order the part automatically as the fault message is received. In another example, a replacement component in inventory can be identified and identified in a repair ticket that is transmitted to a repair technician.

In some embodiments, the present invention enables upgrades to the software that end users are using that may address, for example, compatibility issues, or other necessary upgrades. In one embodiment, the management server can push updates to the lawn mower during operational data transfer operations, or upon powering up the lawn mower. For example, each time the lawn mower is powered on, the PCB can link with the management server and query the management server for updates. This can all occur transparently to the end user, unless a short pause in operation of the lawn mower is required to implement the update or for safety reasons.

FIG. 6 is a diagrammatic representation of an example machine in the form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 905 (e.g., a central processing unit (CPU), a graphics processing unit (GPU), or both), and a main memory 910 and static memory 915, which communicate with each other via a bus 920. The computer system 900 may further include a video display 935 (e.g., a liquid crystal display (LCD)). The computer system 900 may also include an alpha-numeric input device(s) 930 (e.g., a keyboard), a cursor control device (e.g., a mouse), a voice recognition or biometric verification unit (not shown), a drive unit 937 (also referred to as disk drive unit), a signal generation device 940 (e.g., a speaker), and a network interface device 945. The computer system 900 may further include a data encryption module (not shown) to encrypt data.

The disk drive unit 937 includes a computer or machine-readable medium 950 on which is stored one or more sets of instructions and data structures (e.g., instructions 955) embodying or utilizing any one or more of the methodologies or functions described herein. The instructions 955 may also reside, completely or at least partially, within the main memory 10 and/or within the processors 905 during execution thereof by the computer system 900. The main memory 910 and the processors 905 may also constitute machine-readable media.

The instructions 955 may further be transmitted or received over a network via the network interface device 945 utilizing any one of a number of well-known transfer protocols (e.g., Hyper Text Transfer Protocol (HTTP)). While the machine-readable medium 950 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A zero-turn lawn mower having smart mower logic, comprising:
    a chassis;
    a seat, wherein the seat is associated with the chassis for permitting an operator to sit or stand on the chassis;
    a pair of ground engaging drive wheels, wherein the drive wheels move independently of each other;
    an engine, wherein the engine is associated with the chassis;
    a pair of transmissions for driving the drive wheels;
    a pair of manually-moveable handle assemblies for independently controlling the transmissions;
    a mower deck associated with the chassis, wherein the mower deck includes at least one grass-cutting blade; and
    a smart mower logic system comprising a controller that enables at least one of the following:
        incorporating safety logic to increase user safety during normal operation;
        reducing equipment abuse through controlled reduced speed modes;
        monitoring hydraulic pressure readings, torque readings, and wheel revolution readings;
        calibrating and regulating the pair of drive wheels;
        controlling the sensitivity of the pair of handles;
        providing real-time GPS locations readings;
        uploading data in real time to a management server; and
        transmitting a communication and/or billing to customer upon job completion with optional photograph and/or GPS verified time on job data.

2. A zero-turn lawn mower having smart mower logic, comprising:
    a chassis;
    a seat, wherein the seat is associated with the chassis for permitting an operator to sit or stand on the chassis;
    a pair of ground engaging drive wheels, wherein the drive wheels move independently of each other;
    an engine, wherein the engine is associated with the chassis;
    a pair of transmissions for driving the drive wheels;
    a pair of manually-moveable handle assemblies for independently controlling the transmissions;
    a mower deck associated with the chassis, wherein the mower deck includes at least one grass-cutting blade; and
    a smart mower logic system comprising a controller, wherein the controller is configured to at least one of selectively gather, obtain, monitor, store, and record data associated with components of the lawn mower, and wherein the controller communicatively couples the lawn mower with a management server over a network and transmits data to the management server for analysis.

3. A method for using a smart mower logic system with a lawn mower, comprising the steps of:
    providing a lawn mower having a smart mower logic system;
    selectively gathering, obtaining, monitoring, storing, recording, and/or analyzing data associated with components of the lawn mower; and
    controllably communicating and/or disseminating data with at least one of another system and user.

4. A method for using a smart mower logic system with a lawn mower, comprising the steps of:
    obtaining operational data for a lawn mower, the operational data being generated for any of a battery, an engine, a transmission, a transaxle, a blade, a tire, a timer, and a fuel tank of the lawn mower;
    communicatively coupling the lawn mower with a management server;
    querying the lawn mower for operational data for any of the battery, the engine, the transmission, the transaxle, the blade, the tire, the timer, and the fuel tank;
    performing at least one operational data analysis process on the obtained operational data; and
    transmitting an alert message to an owner of the lawn mower if the operational analysis indicates that a threshold violating event has occurred.

5. The method according to claim 4, wherein the at least one operational data analysis process comprises comparing an actual operational time to an operational time threshold, wherein the threshold violating event includes the actual operational time not meeting the operational time threshold.

6. The method according to claim 5, wherein the actual operational time relates to any of the battery, the engine, the transmission, the transaxle, the blade, the tire, the timer, the fuel tank, and the lawn mower.

7. The method according to claim 4, wherein the at least one operational data analysis process comprises comparing an actual engine run time to an engine run threshold, wherein the threshold violating event includes the actual engine run not meeting the engine run time threshold.

8. The method according to claim 4, wherein the at least one operational data analysis process comprises comparing actual square footage covered by the lawn mower assembly to an expected square footage.

9. The method according to claim 4, wherein the actual square footage is calculated by counting transaxle revolutions of the transaxle of the lawn mower.

10. A method for using a smart mower logic system with a lawn mower, comprising the steps of:
    detecting a failure of a component of a lawn mower during operation or startup of the lawn mower;
    establishing communication with a management server; and
    transmitting a fault message to the management server, the fault message comprising an indication as to the component that failed, wherein the component includes any of a battery, an engine, a transmission, a transaxle, a blade, a tire, a timer, and a fuel tank.

11. The method according to claim 10, further comprising receiving an emergency shut down signal from the management server; and performing an emergency shut down upon receiving the emergency shut down signal from the management server.

12. The method according to claim 10, further comprising automatically ordering a replacement part for an identified failed component upon detection of the failure.

13. The method according to claim 10, further comprising pushing an update to the lawn mower upon establishing communication with the management server.

* * * * *